(12) United States Patent
Kondo et al.

(10) Patent No.: US 6,636,989 B1
(45) Date of Patent: Oct. 21, 2003

(54) ELECTRONIC CONTROL APPARATUS AND METHOD FOR ON-BOARD REWRITING OF NON-VOLATILE MEMORIES

(75) Inventors: Koji Kondo, Okazaki (JP); Naoki Shibayama, Yokkaichi (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/494,400

(22) Filed: Jan. 31, 2000

(30) Foreign Application Priority Data

Feb. 17, 1999 (JP) ............................................ 11-038504

(51) Int. Cl.[7] ................................................ G06F 11/00
(52) U.S. Cl. ............................................ 714/23; 712/37
(58) Field of Search ............................... 714/23, 51, 13; 700/2, 79; 712/31, 37; 709/211, 208

(56) References Cited

U.S. PATENT DOCUMENTS

| | | | |
|---|---|---|---|
| 5,321,845 A | * 6/1994 | Sawase et al. | 712/37 |
| 5,828,977 A | 10/1998 | Hayashi et al. | |
| 5,835,706 A | * 11/1998 | Hikichi et al. | 714/49 |
| 6,144,887 A | * 11/2000 | Kamiya et al. | 700/79 |
| 6,151,530 A | * 11/2000 | Ino | 700/47 |
| 6,341,239 B1 | * 1/2002 | Hayashi et al. | 700/79 |
| 6,493,593 B1 | * 12/2002 | Kamiya et al. | 700/2 |

FOREIGN PATENT DOCUMENTS

JP          10-177504          6/1998

* cited by examiner

Primary Examiner—Robert Beausoliel
Assistant Examiner—Christopher S. McCarthy
(74) Attorney, Agent, or Firm—Nixon & Vanderhye P.C.

(57) ABSTRACT

An electronic control apparatus for vehicles has at least two microcomputers, each having a non-volatile flash memory which stores a vehicle control program and data. Each microcomputer is reset when an abnormality is detected. Each microcomputer is applied with an identification signal indicative of a main one or sub one. When a data rewriting instruction is applied from an external writing device, one microcomputer which receives the identification signal indicative of the main one operates to release the other microcomputer from the reset condition after an elapse of a delay time period. A new control program and data transmitted from the external writing device is written into the corresponding flash memory in place of the previously stored control program and data.

17 Claims, 9 Drawing Sheets

ELECTRONIC CONTROL APPARATUS AND METHOD FOR ON-BOARD REWRITING OF NON-VOLATILE MEMORIES

CROSS REFERENCE TO RELATED APPLICATION

This application relates to and incorporates herein by reference Japanese Patent Application No. 11-38504 filed on Feb. 17, 1999.

BACKGROUND OF THE INVENTION

1. Field of the Invention

The present invention relates to electronic control apparatuses and methods, and particularly to an electronic control apparatus including a plurality of microcomputers capable of on-board rewriting of control programs and control data and a method of on-board rewriting.

2. Related Art

Figure 9:
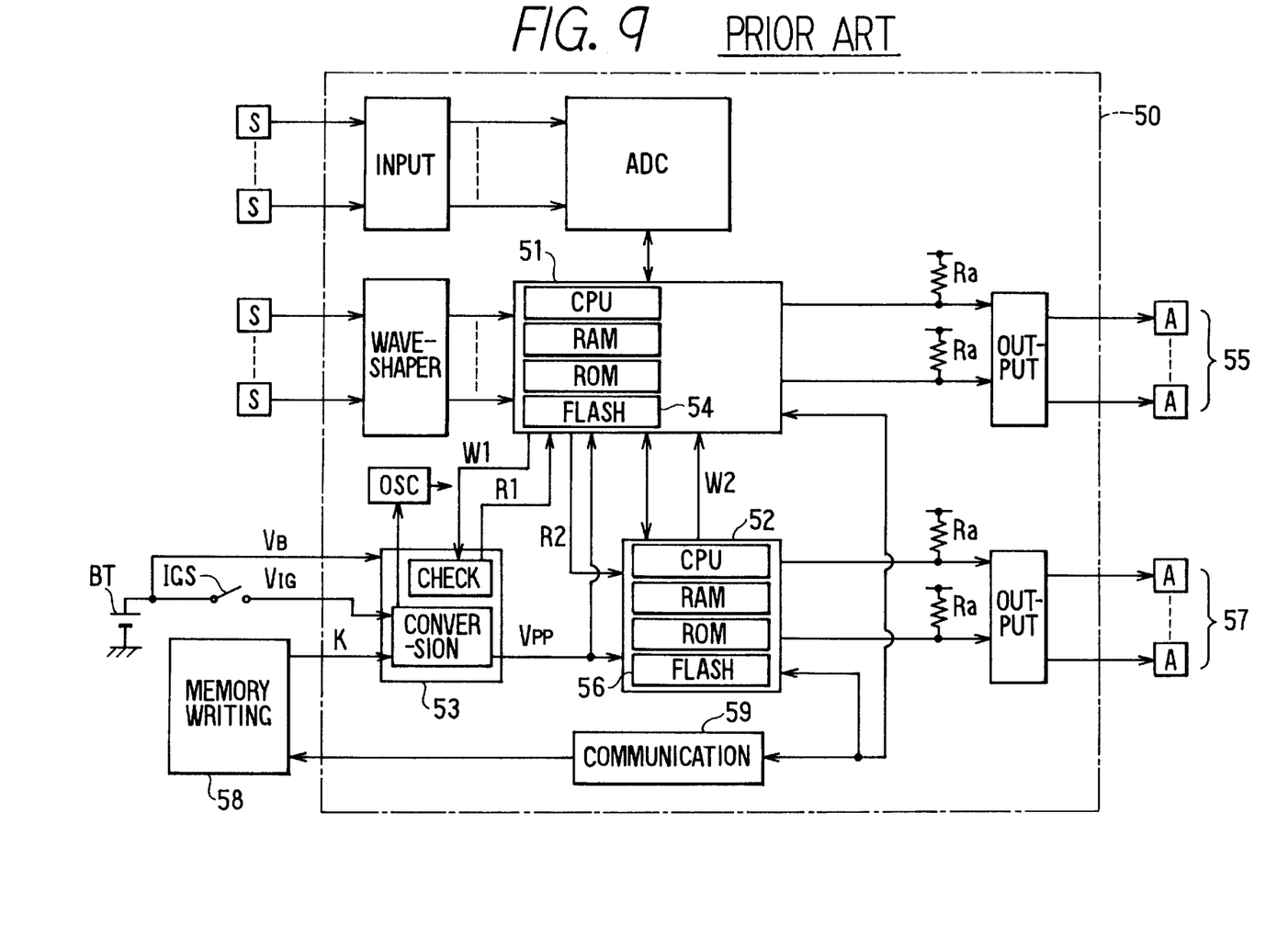
FIG. 9 is a circuit diagram showing a conventional electronic control apparatus.

It is proposed in U.S. patent application Ser. No. 987,062 filed on Dec. 8, 1997 and now U.S. Pat. No. 6,144,887 issued Nov. 7, 2000 (JP-A-10-177504) to provide a plurality of microcomputers in an electronic control apparatus for vehicles and on-board rewrite respective control programs and control data. One such apparatus may be constructed as shown in FIG. 9.

In the above construction, a main microcomputer 51 and a sub microcomputer 52 in an electronic control unit 50 are programmed to control actuators 55 and 57, respectively. The microcomputers 51 and 52 produce respective watch-dog signals W1 and W2 while in operation, so that the main microcomputer 51 is reset by a reset signal R1 from a power circuit 53 and the sub microcomputer 52 is reset by a reset signal R2 from the main microcomputer 51. The microcomputers 51 and 52 are designed to rewrite respective programs and data in non-volatile flash memories 54 and 56 through a communication circuit 59 connected to a memory writing device 58 while being mounted on a vehicle (on-board rewriting). The output ports of both microcomputers 51 and 52 are held at high impedance by respective resistors Ra during the on-board rewriting operation so that erroneous outputs are not produced to actuators 55 and 57 until the microcomputers 51 and 52 are reset and start the execution of respective programs.

The main microcomputer 51 is designed to produce the reset signal R2 from its general-purpose output port. This construction causes the general-purpose port of the main microcomputer 51 to become high impedance, when the main microcomputer 51 is put in the rewriting operation. As a result, the flash memory 56 of the sub microcomputer 52 is disabled from being rewritten, because the sub microcomputer 52 cannot be released from the reset condition.

SUMMARY OF THE INVENTION

It is therefore an object of the present invention to provide an electronic control apparatus in which on-board rewriting of both non-volatile memories are executed without fail.

According to the present invention, an electronic control apparatus for vehicles has a main microcomputer and a sub microcomputer each of which has a non-volatile flash memory storing a vehicle control program and data. Each microcomputer is reset when an abnormality is detected, and its output ports are held at high impedance condition. When a data rewriting instruction is applied from an external writing device, the main microcomputer operates to release the sub microcomputer from the reset condition. A new control program and data transmitted from the external writing device is written into the corresponding flash memory in place of the previously stored control program and data.

Preferably, each microcomputer is applied with an identification signal indicative of a main one or sub one so that each microcomputer may determine whether it is the main microcomputer. Further, the releasing of the sub microcomputer from the, reset condition is effected after a predetermined delay period from the data rewriting instruction so that the data rewriting is effected after the microcomputers are put in a stable operation.

BRIEF DESCRIPTION OF THE DRAWINGS

Further objects, features and advantages of the present invention will become more apparent from the following detailed description made with reference to the accompanying drawings.

DETAILED DESCRIPTION OF THE PREFERRED EMBODIMENT

The present invention will be described in detail with reference to various embodiments.

(First Embodiment)

Figure 1:
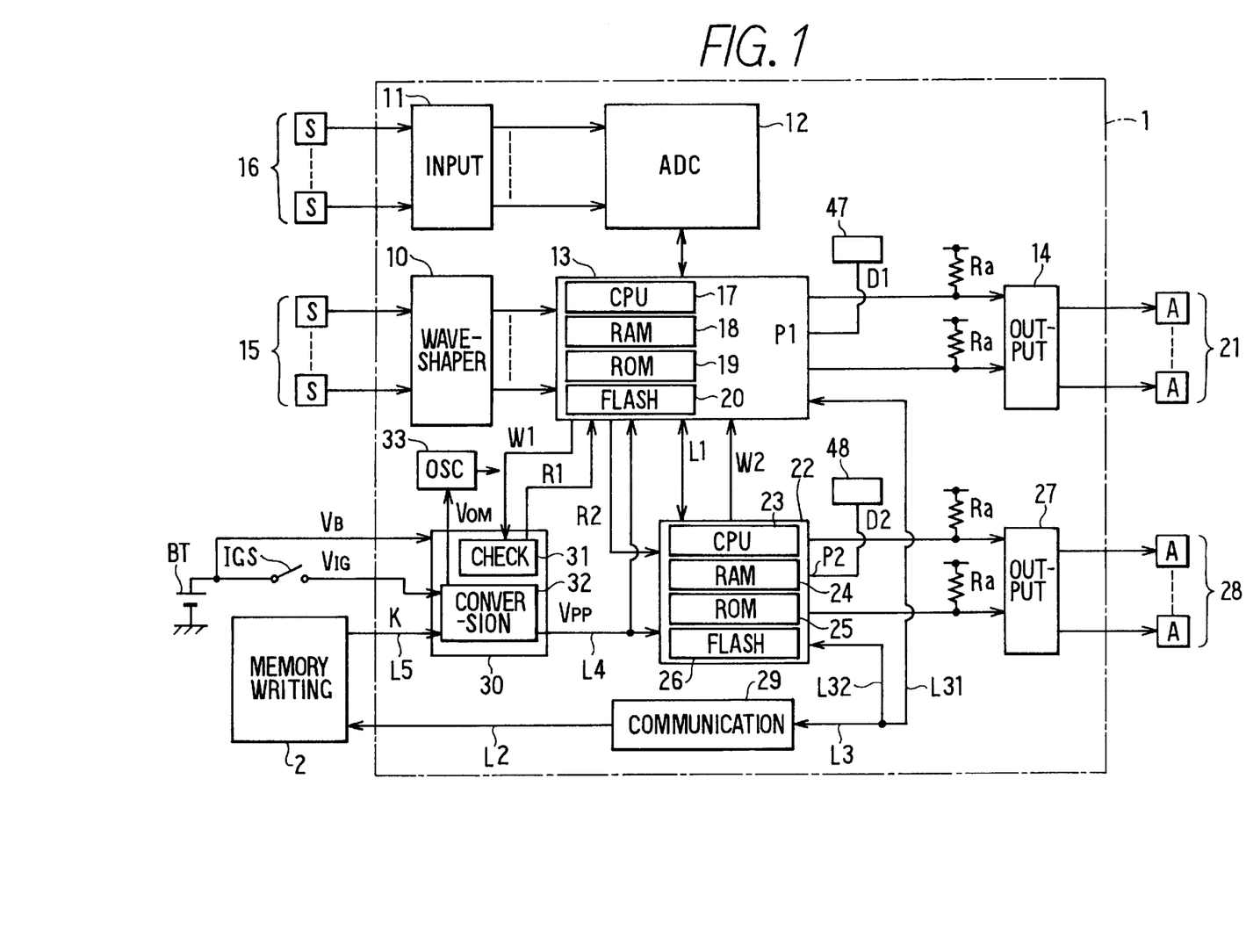
FIG. 1 is a circuit diagram showing an electronic control apparatus according to a first embodiment of the present invention.

Referring first to FIG. 1, an electronic control apparatus comprises an electronic control unit (ECU) 1 and a memory writing device 2. The ECU 1 is mounted on a vehicle for controlling an internal combustion engine (not shown) by actuators (A) 21 and an automatic transmission (not shown) by actuators (A) 28. The memory writing device 2 is connectable to the ECU 1 when control programs and control data for an engine control and a transmission control are to be rewritten under a condition that the ECU 1 is mounted on the vehicle.

The ECU 1 has a wave-shaper circuit 10, an input circuit 11 and an A/D converter (ADC) 12, a main microcomputer (main computer) 13 and an output circuit 14. The wave-shaper circuit 10 shapes waveforms of a pulse signal generated in response to engine rotation and on/off signals from sensors 15. The input circuit 11 filters out noises of analog signals corresponding to engine intake air amount, throttle position and the like generated from analog sensors 16. The A/D converter 12 converts the analog signals from the input circuit 11 to corresponding digital signals.

The main computer 13 has a CPU 17, a RAM 18, a mask ROM 19 and a flash memory 20. The CPU 17 controls the engine, for instance, fuel injection amount and ignition timing, based on control programs and data stored in the mask ROM 19 and the flash memory 20. The RAM 18 temporarily stores calculation data of the CPU 17. The main computer 13 drives the actuators 21 through an output circuit 14 based on the calculation results of the CPU 17.

The sub computer 22 has a CPU 23, a RAM 24, a mask ROM 25 and a flash memory 26. The CPU 23 controls the automatic transmission, for instance, transmission gear change timing, based on control programs and data stored in the mask ROM 25 and the flash memory 26. The RAM 24 temporarily stores calculation data of the CPU 23. The sub computer 22 drives the actuators 28 through an output circuit 27 based on the calculation results of the CPU 23. The sub computer 22 is connected to the main computer 13 through a direct memory access (DMA) communication line L1 to exchange control data such as the throttle position data and a torque control signal.

The flash memories 20 and 26 are non-volatile ROMs which are capable of rewriting (erasing and writing) respective storage information (programs and data). The rewriting operation is enabled under a condition that a predetermined writing voltage Vpp (7.5 volts) is supplied from a power circuit 30 and the computers 13 and 22 are released from the reset condition, that is, not in the reset condition.

The output ports of the computers 13 and 22 are connected to external resistors Ra so that the phase of the output signals are fixed when the flash memories 20 and 26 are subjected to rewriting. The output ports are held at high impedance condition not to produce erroneous output signals when the computers 13 and 22 are reset. Thus, the actuators 21 and 28 are restricted from operating erroneously in response to the erroneous output signals during the flash memory rewriting operation. That is, the vehicle condition is protected from changing in dependence on the computers 13 and 22.

The ECU 1 further has a communication circuit 29 which executes serial data communications between the memory writing device 2 and the computers 13 and 22. The communication circuit 29 is connectable to the memory writing device 2 through a serial communication line L2, and is connected to the computers 13 and 22 through a serial communication line L3 including lines L31 and L32.

The communication circuit 29 forwards data transmitted from the memory writing device 2 through the serial communication line L2 to the computers 13 and 22 through the serial communication line L3. It also forwards data transmitted from the computers 13 and 22 through the serial communication lines L3 to the memory writing device 2 through the serial communication line L2.

The power circuit 30 has a check circuit (watch-dog timer circuit) 31 and a voltage conversion circuit 32. The voltage conversion circuit 32 is connected to a vehicle-mounted battery BT through an ignition switch IGS so that it is supplied with an ignition switch voltage VIG (same as a battery voltage VB, 12 volts) when the ignition switch IGS is turned on. Specifically, the voltage conversion circuit 32 converts the voltage VIG to an operation voltage (5 volts) VOM to supply the operation voltage VOM to peripheral circuits including the A/D conversion circuit 12, the computers 13 and 22, an oscillation circuit 33 and the like. The voltage conversion circuit 32 converts the voltage VIG to a writing voltage Vpp (7.5 volts) to supply the writing voltage Vpp to the computers 13 and 22 through a writing voltage supply line L4. The writing voltage Vpp is produced when the ignition switch IGS is turned on under a condition that a writing permission signal K is applied from the memory writing device 2.

The check circuit 31 of the power circuit 30 is connected to receive a watch-dog signal W1 from the main computer 13. It determines that an abnormality occurred in the software processing in the main computer 13 and produces a reset signal R1 to the main computer 13, when no watch-dog signal is produced from the main computer 13, specifically when the watch-dog signal does not change its output level within a predetermined time period. Thus, the check circuit 31 monitors the software processing of the main computer 13 and resets the main computer 13 upon detection of abnormality.

The flash memories 20 and 26 of the computers 13 and 22 stores therein an engine control program and an automatic transmission control program and control data to be used in the execution of these programs, respectively. The engine control program stored in the flash memory 20 includes a signal generating program for generating the watch-dog signal W1 which changes its output level every predetermined time period, and a monitoring program for monitoring the operation of the sub computer 22. The automatic transmission control program stored in the flash memory 26 includes a signal generating program for generating a watch-dog signal W2 which changes its output level every predetermined time period. The CPU 17 of the main computer 13 monitors the software processing of the sub computer 22 to produce a reset signal R2 upon detection of abnormality in the sub computer 23.

The mask ROMs 19 and 25 are non-volatile memories which are incapable of rewriting, and store therein boot programs which are executed when the computers 13 and 22 are initialized. The boot programs stored in the mask ROMs 19 and 25 are the same to each other. Specifically, under a normal condition in which the memory writing device 2 is not connected to the ECU 1, the execution of the boot programs in the mask ROMs 19 and 25 is started and the control programs in the flash memories 20 and 26 are executed when the computers 13 and 22 are initialized. Under another condition in which the memory writing device 2 is connected to the ECU 1 to rewrite the storage information in the flash memories 20 and 26, the execution of the boot programs are continued without instantly calling the control programs in the flash memories 20 and 26. A rewriting processing is executed to write the data (that is, new control programs and new control data to be written into the flash memories 20 and 26) transmitted from the memory writing device 2, thus updating or rewriting the storage information of the flash memories 20 and 26. After completing the rewriting processing, the new control programs and the new control data are called to be used for the engine control and the transmission control in the same manner as in the normal condition.

The memory writing device 2 primarily comprises a CPU, a ROM, a RAM and the like, and is constructed to be connectable to and detachable from the ECU 1 through a connector (not shown). The writing device 2 is connected to the communication circuit 29 through the serial communication line L2 and the power circuit 30 through a signal line L5.

The writing device 2 has a computer selection switch, storage medium and the like. The computer selection switch is for selecting one of the flash memories 20 and 26 in the computers 13 and 22 which is to be subjected to rewriting.

The storage medium is for storing the data (new control programs and new control data) to be transmitted to the ECU 1. The data to be transmitted to the ECU 1 has identification codes for specifying the computer which is to be subjected to the rewriting.

A signal generation circuit 47 is connected to an input terminal (port) P1 of the main computer so that an identification voltage D1 indicative of the main computer is applied to the terminal P1. Similarly, a signal generation circuit 48 is connected to an input terminal (port) P2 of the sub computer 22 so that an identification voltage D2 indicative of the sub computer is applied to the terminal P2. The identification voltages D1 and D2 are used as codes indicative of the computers 13 and 22 in the execution of the boot programs.

Figure 2:
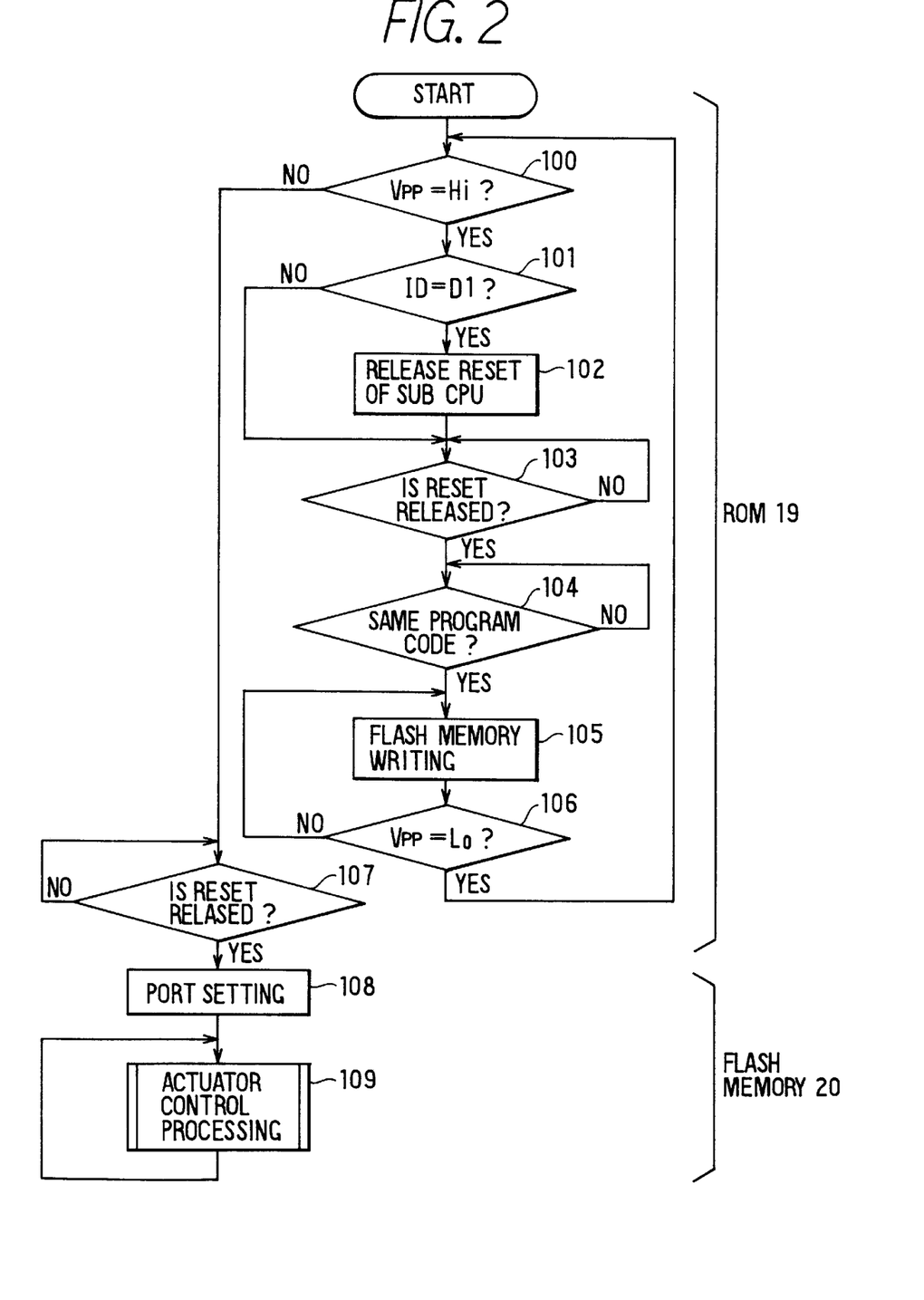
FIG. 2 is a flow diagram showing a processing of memory rewriting in the first embodiment.

The CPUs 17 and 23 of the computers 13 and 22 execute the software processing shown in FIG. 2. Steps 100–107 are processing executed in the boot programs in the ROMs 19 and 25, and steps 108–109 are processing executed in the programs of the flash memories 20 and 25.

First, it is checked at step 100 whether the writing voltage Vpp applied to the computers 13 and 22 are at the high level (Hi). If the check result is NO (not high), it is checked whether the reset condition is released. If YES (released from reset), the output ports of the computers 13 and 22 are set to arbitrary impedance conditions from the high impedance conditions based on the programs stored in the flash memories 20 and 23. After the port setting, the normal control processing are executed at step 109. That is, the main computer 13 executes the engine control processing and the sub computer 22 executes the transmission control processing until the ignition switch IGS is turned off. The step 109 in the program of the main computer 13 includes a step of producing a reset release signal to the sub computer 22.

If the check result at step 100 is YES (high), the processing proceeds to step 101. It is to be noted that the CPUs 17 and 23 execute the programs only when the reset condition is released. Therefore, the programs are not executed even when the voltage VIG is supplied, unless the reset condition is released, that is, unless the signals R1 and R2 are at high level. Further, the output terminals of the computers 13 and 22 are at the high impedance under the reset condition, and are changed to the arbitrary impedance by the program processing (port setting) in the flash memories 20 and 26.

It is checked at step 101 whether the identification code ID is the predetermined one (for instance, D1). That is, the computers 13 and 22 check whether the identification code ID is for itself or for the other.

If the check result is YES (for instance, D1), the main computer 13 produces the reset release signal to the sub computer 22 at step 102. Thus, the main computer 13 determines that it is the timing of rewriting the flash memory 20 and produces the reset release signal to the sub computer 22. If the check result is NO (for instance, D2), step 102 is not executed so that the sub computer 23 is put in the reset-release wait condition.

It is checked at step 103 whether the reset condition is released. If the check result is YES (reset-released), the following flash memory rewriting processing is executed. In the rewriting processing, the CPUs 17 and 23 receives program codes ID transmitted from the writing device 2. It is checked at step 104 whether the received program code ID is the same as its own, the storage information in the flash memories 20 and 26 are rewritten at step 105.

Specifically, in the case of rewriting the flash memory 20, the main computer 13 is released from the reset condition and the storage information in the flash memory 20 is replaced with the new data transmitted from the writing device 2. In the case of rewriting the flash memory 26, the sub computer 22 is released from the reset condition (step 102) and the storage information in the flash memory 26 is replaced with the new data transmitted from the writing device 2. Thus, contrary to the conventional case (FIG. 9), the rewriting of the flash memory 26 of the sub computer 22 is enabled by forcibly generating the reset release signal to the sub computer 22 at step 102.

It is checked at step 106 whether the rewriting voltage Vpp is at the low level (Lo). If the check result is NO (high), the above rewriting operation is continued. If the check result is YES (low), the rewriting operation is terminated. The processing returns to step 100. As the rewriting voltage Vpp is low, the processing proceeds to steps 107–109 to execute the normal control processing.

Figure 3:
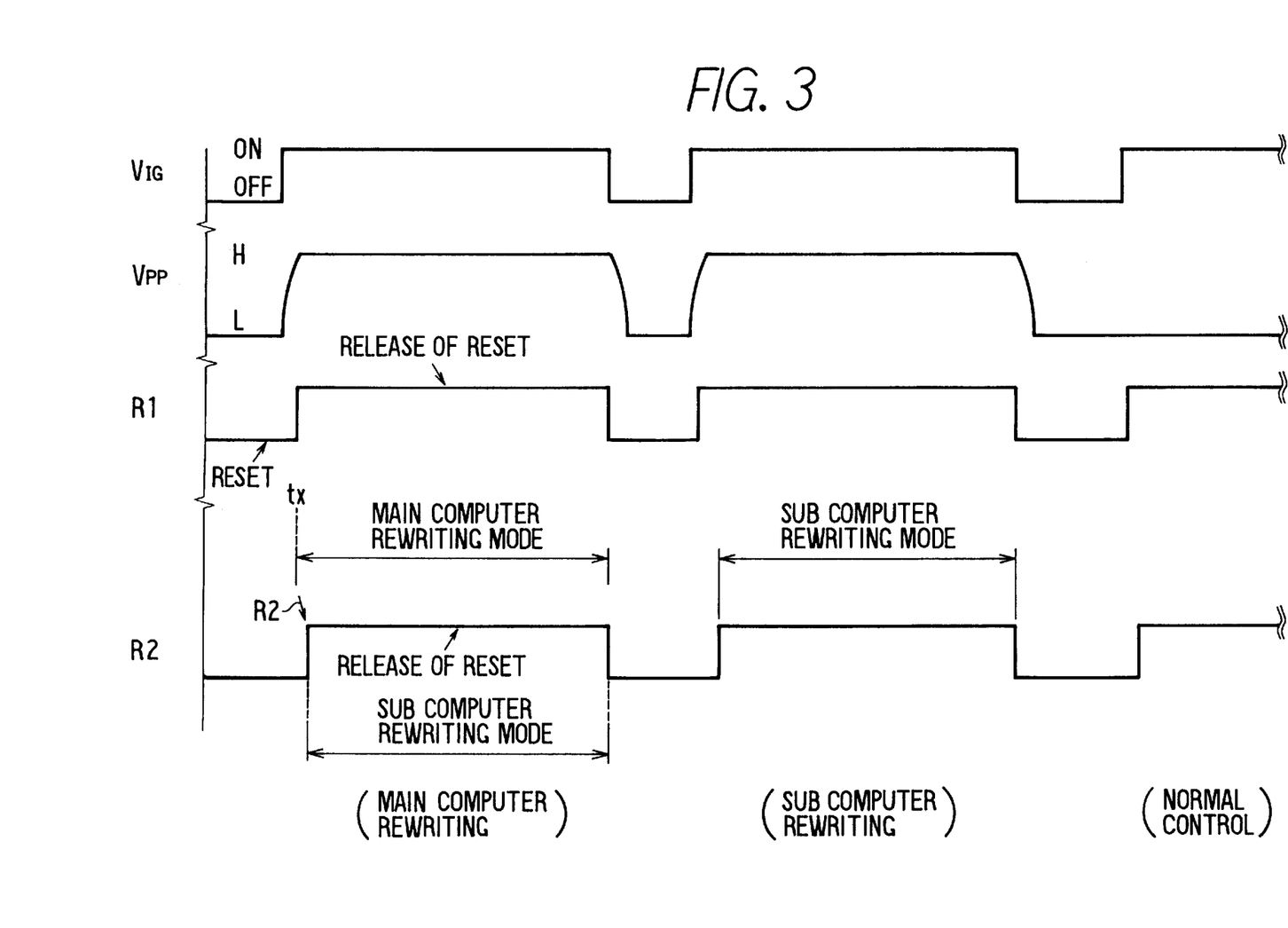
FIG. 3 is a timing diagram showing memory rewriting operations in the first embodiment.

In the rewriting operation, as shown in FIG. 3, the main computer 13 is put in the rewriting mode when the signal R1 is set to the reset release level under the condition that the writing voltage Vpp is supplied. At reset release timing tx of the main computer 13, the signal R2 is set to the reset release level by step 102 in FIG. 2. The sub computer 22 is put in the rewriting mode, because the sub computer 22 is in the reset-released condition under the condition that the writing voltage Vpp is supplied after the ignition switch IGS is turned off from the turned on condition and again turned on.

That is, the computers are programmed to execute respective programs only under the reset-released condition. Thus, the programs are executed only after the reset is released, even when the voltage VIG is supplied. The output terminals of the computers 13 and 22 are held at the high impedance, and are changed to the arbitrary impedance by the above port setting (step 108).

The above embodiment provides the following advantages.

(a) The main computer 13 produces the reset release signal to the sub computer 22 at step 102 in FIG. 2, when it determines at step 100 in FIG. 2 that it is the timing of rewriting the flash memory 20. Thus, it is ensured to put the sub computer 22 in the rewriting mode.

(b) The main computer 13 and the sub computer 22 executes the common boot program to rewrite the respective flash memories 20 and 26, and receives the identification voltages D1 and D2 for computer identification. The reset release signal is forcibly produced from one computer which identifies to be the main from the identification signals D1 and D2, it need not be specifically checked which one is the main computer.

(Second Embodiment)

Figure 4:
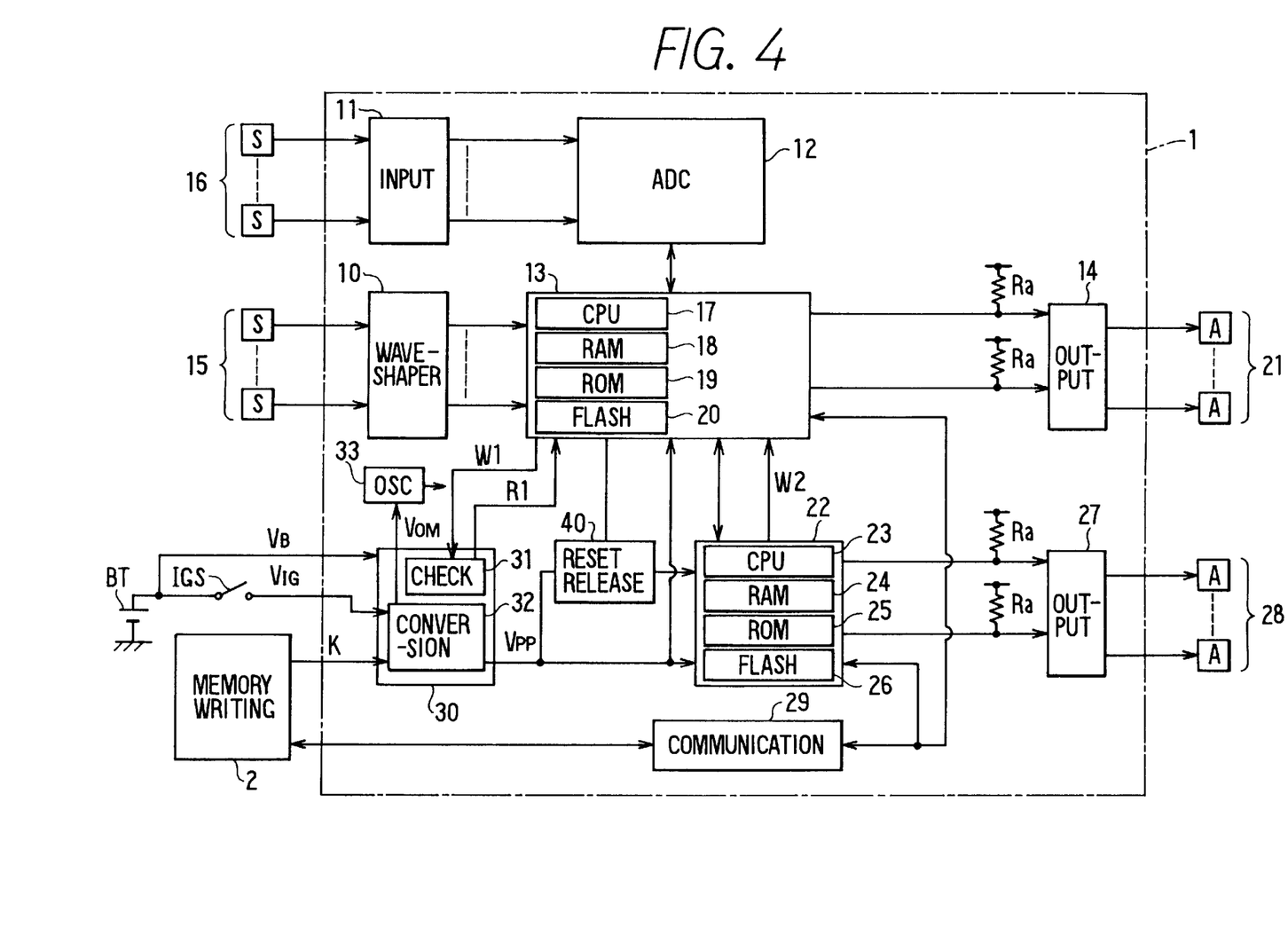
FIG. 4 is a circuit diagram showing an electronic control apparatus according to a second embodiment of the present invention.
Figure 5:
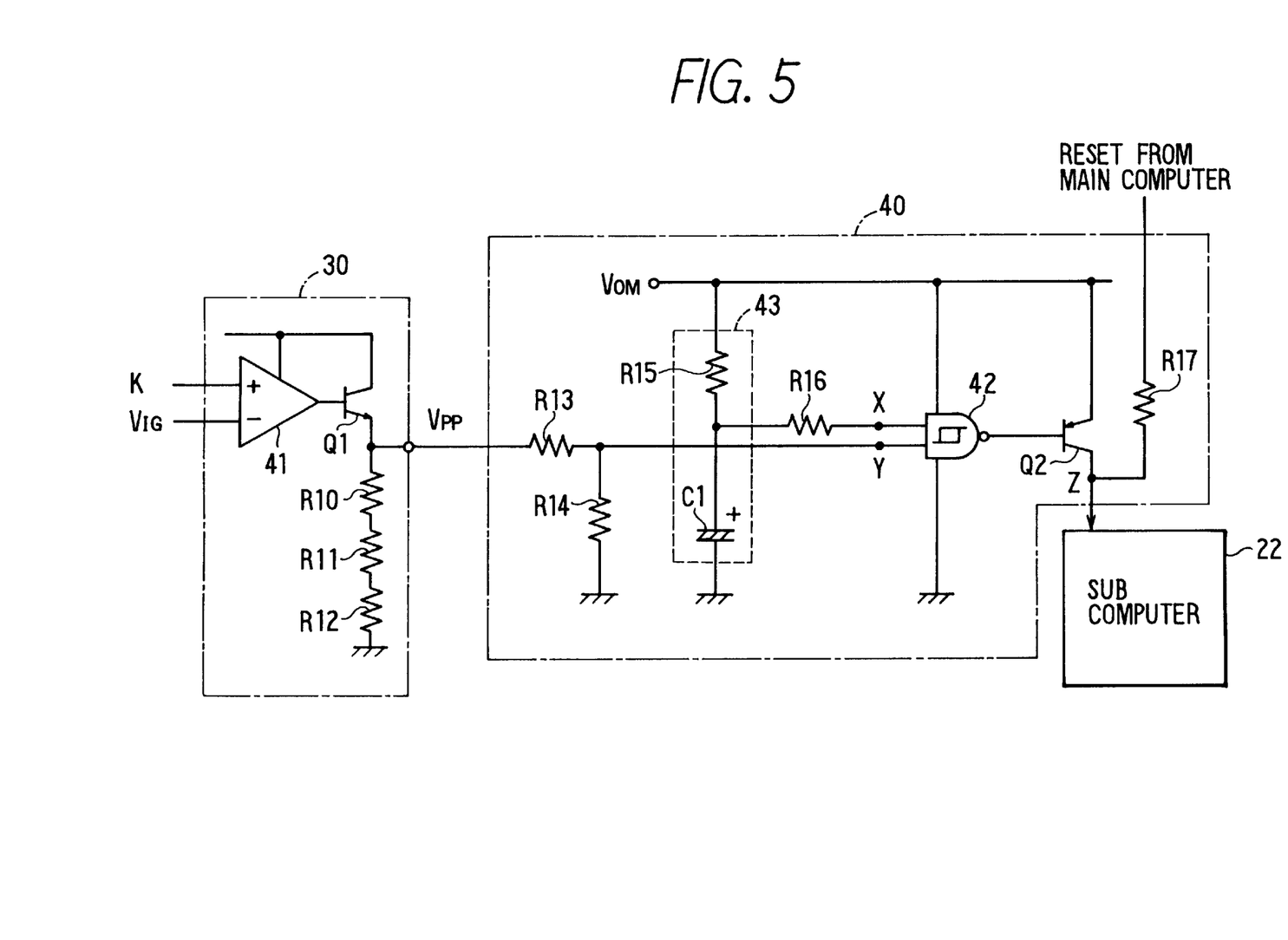
FIG. 5 is a circuit diagram showing a reset circuit used in the second embodiment.

In a second embodiment, a hardware circuit, that is, a reset release circuit 40 is provided as shown in FIG. 4. The reset release circuit 40 is constructed as shown in FIG. 5.

That is, the power circuit 30 has a comparator 41, a transistor Q1 and resistors R10, R11, R12. The rewriting permission signal K and the voltage VIG are applied to the comparator 41 so that the comparator 41 produces the high level output signal which turns on the transistor Q1 in response to the rewriting permission signal K and the voltage VIG.

The reset release circuit 40 is connected to the emitter of the transistor Q1. The reset release circuit 40 has resistors R13 and R14, a delay circuit 43, a NAND gate 42 and a transistor Q2. The emitter of the transistor Q1 is connected to the NAND gate 42 through the resistors R13 and R14. The operation voltage VOM (5 volts) is applied to the NAND gate 42 through the delay circuit 43 which comprises a resistor R15 and a capacitor C1. The output of the NAND gate 42 is connected to the base of the transistor Q2. The collector of the transistor Q2 is connected to the reset signal line of the main computer 13 to the sub computer 22. Thus, the operation voltage VOM is supplied to the sub computer 22 as the reset release signal, when the transistor Q2 turns on.

Figure 6:
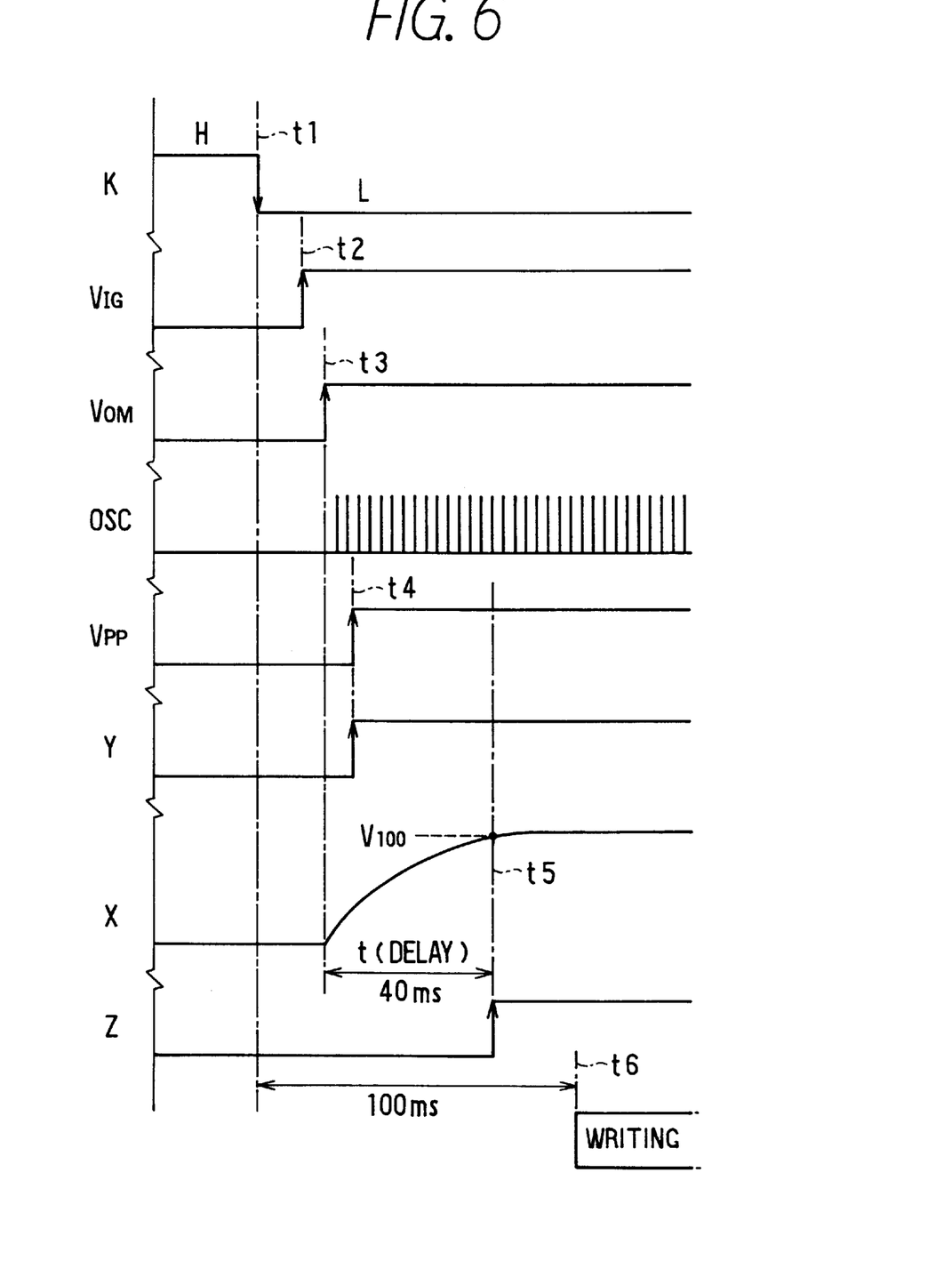
FIG. 6 is a timing diagram showing memory rewriting operations in the second embodiment.

It is assumed that the rewriting permission signal K is applied to the power circuit 30 at timing t1 in FIG. 6. Then, the voltage VIG is supplied to the power circuit 30 at timing t2. The voltage conversion circuit 32 of the power circuit 30 generates the operation voltage VOM at timing t3. The oscillation circuit 33 responsively starts its oscillation with the operation voltage VOM, and produces clock signals to the computers 13 and 22 and the like. The operation voltage VOM is supplied to the NAND gate 42 through the delay circuit 43 in the reset release circuit 40. As a result, the voltage at point X increases gradually.

The voltage conversion circuit 32 of the power circuit 30 produces the writing voltage VPP at timing t4 and supplies it to the reset release circuit 40. As a result, the voltage at point Y rises to the high level.

The voltage at point X reaches a voltage V100 after a delay time t of the delay circuit 43 from the rise of the operation voltage VOM at timing t3. As a result, the NAND gate 42 produces a low level signal to turn on the transistor Q2, thus raising the voltage at point Z to the high level. This high level signal is applied to the reset terminal of the sub computer 22. The delay time t of the delay circuit 43 may be set to about 40 ms in which the oscillation circuit 33 oscillates stably.

When a predetermined time period (for instance, 100 ms) elapses after the rewriting permission signal K is applied, the writing is started at timing t6. In the case of rewriting the flash memory 26 in the sub computer 22, the storage information in the flash memory 26 is replaced with the data transmitted from the writing device 2 under the condition that the writing voltage Vpp is supplied, because the sub computer 22 is released from the reset condition.

The second embodiment provides the following advantages.

(a) The reset release circuit 40 forcibly produce the reset release signal to the sub computer 22 with the rewriting voltage Vpp from the voltage conversion circuit 32 of the power circuit 30. As a result, contrary to the conventional case, the sub computer 22 can be put in the rewriting mode without fail.

(b) In the reset release circuit 40, the NAND gate 42 is used to produce the reset release signal in response to both the rewriting voltage and the operation voltage VOM supplied to the oscillation circuit 33. As a result, the reset release signal can be produced in consideration of the operation voltage in the appropriate manner.

(c) The delay circuit 43 in the reset release circuit 40 delays the timing of the reset release signal from the timing of the rewriting permission signal K. As a result, the reset release signal can be generated after the operation of the oscillation circuit 33 and hence the operation of the computers are stabilized.

(Third Embodiment)

Figure 7:
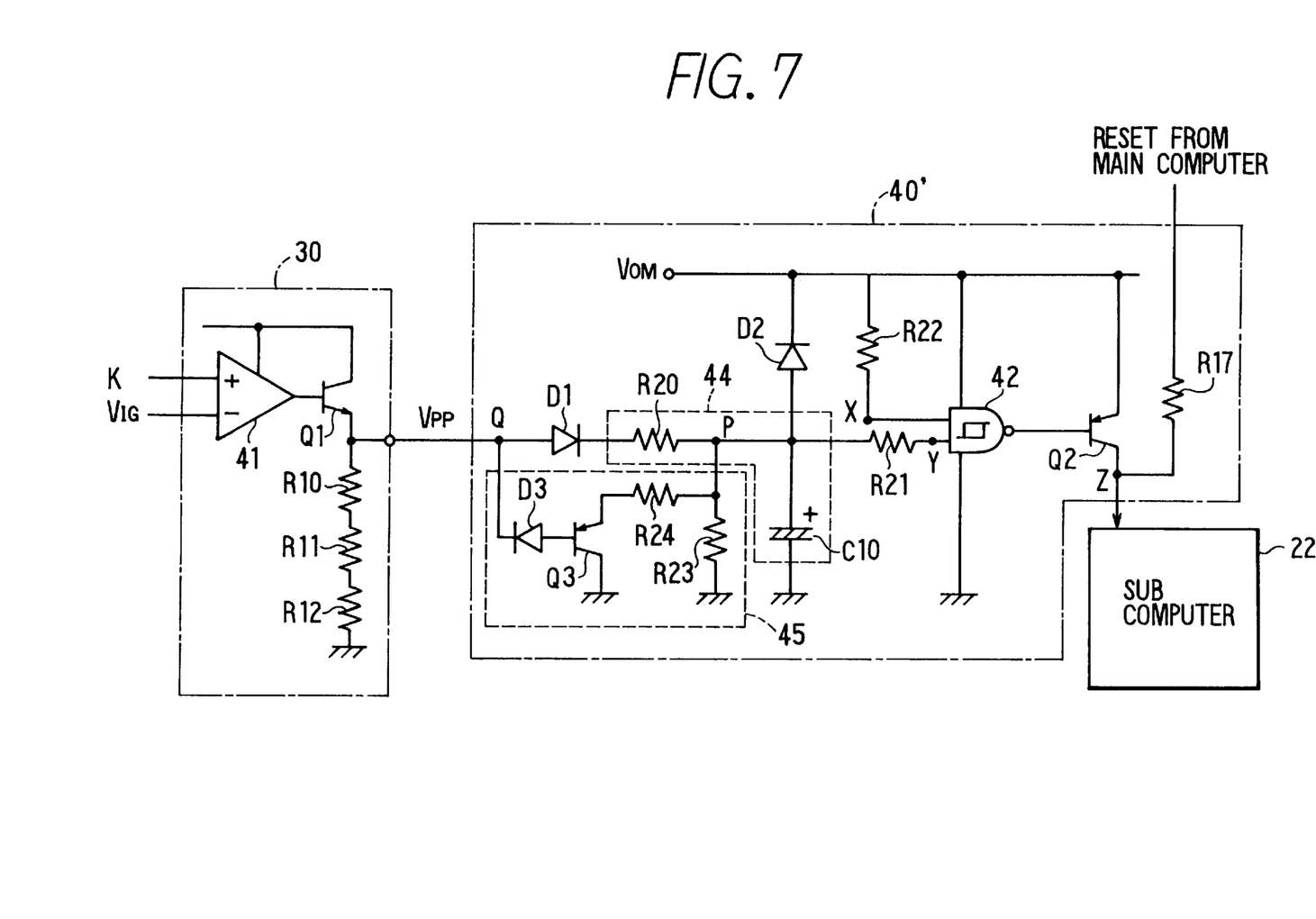
FIG. 7 is a circuit diagram showing a reset circuit used in a third embodiment of the present invention.

In a third embodiment, a reset release circuit 40' is constructed as shown in FIG. 7. That is, the power circuit 30 has a comparator 41, a transistor Q1 and resistors R10, R11, R12. The rewriting permission signal K and the voltage VIG are applied to the comparator 41 so that the comparator 41 produces the high level output signal which turns on the transistor Q1 in response to the rewriting permission signal K and the voltage VIG.

The reset release circuit 40' is connected to the emitter of the transistor Q1. The reset release circuit 40' has diodes D1 and D2, resistors R21 and R22, a NAND gate 42, a delay circuit 44, a restoration circuit 45 and a transistor Q2. The emitter of the transistor Q1 is connected to the NAND gate 42 through the delay circuit 44 and the resistor R21. The delay circuit 44 comprises a resistor R20 and a capacitor C10. The operation voltage VOM (5 volts) is applied to the NAND gate 42 through the resistor R22. The restoration circuit 45 is connected to points P (junction between the resistor R20 and the capacitor C10) and Q (emitter of the transistor Q1). The restoration circuit 45 comprises a diode D3, transistor Q3 and resistors R23, R24.

Figure 8:
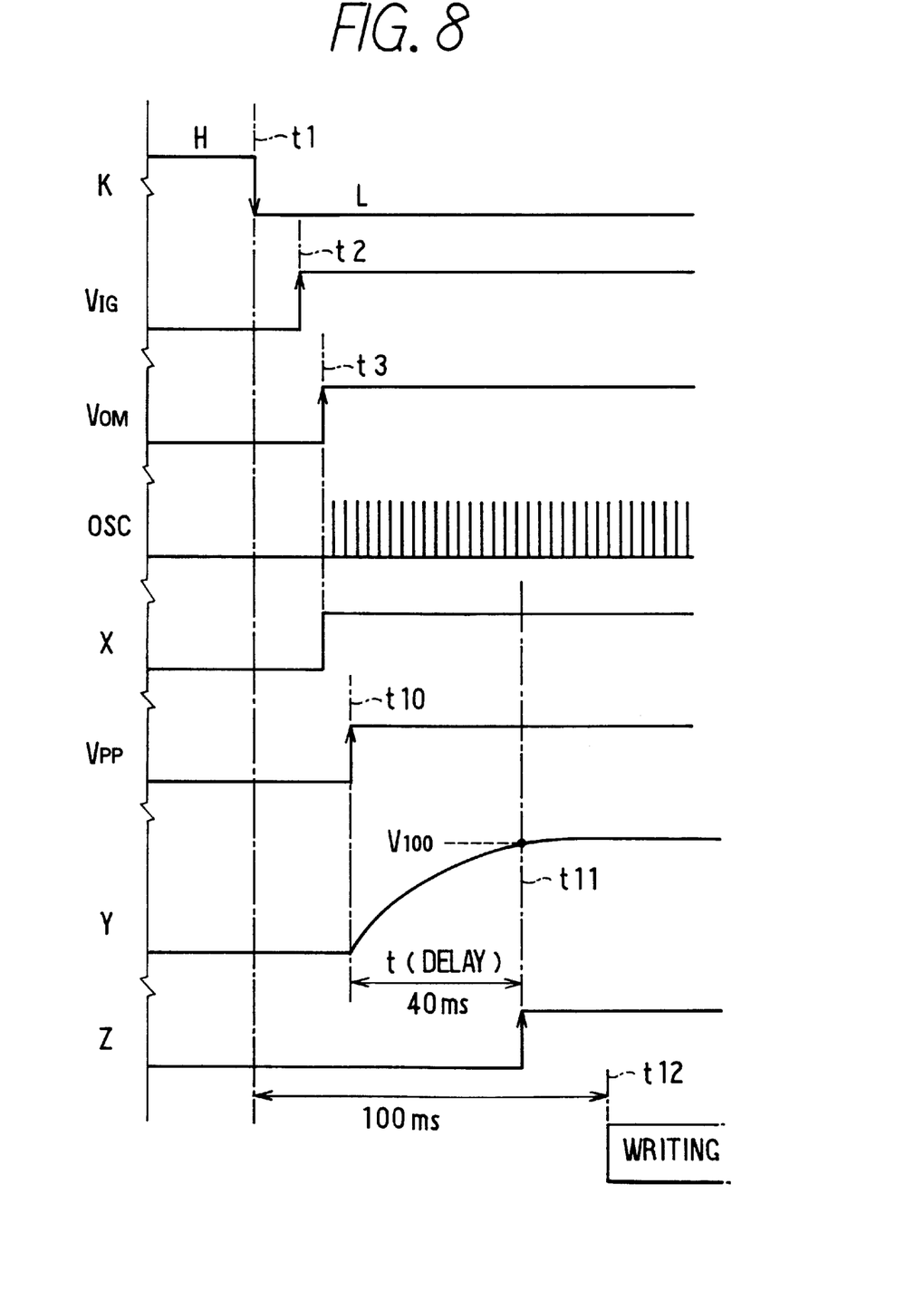
FIG. 8 is a timing diagram showing memory rewriting operations in the third embodiment.

It is assumed that the rewriting permission signal K (low level) is applied to the power circuit 30 at timing t1 in FIG. 8. Then, the voltage VIG is supplied to the power circuit 30 at timing t2. The voltage conversion circuit 32 of the power circuit 30 generates the operation voltage VOM at timing t3. The oscillation circuit 33 responsively starts its oscillation with the operation voltage VOM, and produces clock signals to the computers 13 and 22 and the like. The rewriting permission signal Vpp rises at timing t10, and is applied to the NAND gate 42 through the delay circuit 44. Thus, the voltage at the point Y rises gradually.

The voltage at point Y reaches the voltage V100 at timing t11 after the delay time t of the delay circuit 44 from the rise of the rewriting permission signal Vpp. As a result, the NAND gate 42 produces the low level signal to turn on the transistor Q2, thus raising the voltage at point Z to the high level. This high level signal is applied to the reset terminal of the sub computer 22. The delay time t of the delay circuit 43 may be set to about 40 ms in which the oscillation circuit 33 oscillates stably. When a predetermined time period (for instance, 100 ms) elapses after the rewriting permission signal K is applied, the writing is started at timing t12.

When the rewriting of the flash memory is completed, the rewriting permission signal K changes to the high level which turns off the transistor Q1. With the decrease in the voltage Vpp at the point Q, the transistor Q3 in the restoration circuit 45 turns on to immediately discharge the capacitor C10 in the delay circuit 44. That is, the voltage at the point P is lowered quickly so that normal control processing of the computers 13 and 22 can be initiated at the earliest time.

The third embodiment provides the following advantages.

(a) The delay circuit 44 in the reset release circuit 40' delays the timing of the reset release signal from the timing of the rewriting voltage. As a result, the reset release signal can be generated after the operation of the oscillation circuit 33 and hence the operation of the computers are stabilized.

The present invention should not be limited to the foregoing embodiments, but may be implemented in various other ways. For instance, The present invention may be applied to a system in which more than two sub computers are used.

What is claimed is:

1. An electronic control apparatus comprising:
   a plurality of computers having respective non-volatile memories which are capable of rewriting storage information in response to data transmitted from an external side, each computer being put in a memory rewriting mode when a rewriting voltage is applied and is released from a reset condition, and terminals of each computer being set to a high impedance condition during a rewriting operation;

identification signal generating means for generating an identification signal indicative of a main computer among the plurality of computers; and reset release signal generating means for generating a reset release signal from one of the plurality of computers to another of the plurality of computers at the time of putting the plurality of computers in the memory rewriting mode, the one and the another of the plurality of computers being determined as the main computer in response to the identification signal and a sub computer, respectively, wherein the main computer is constructed to monitor the sub computer and apply a reset signal to the sub computer to reset the sub computer upon detection of an abnormality in the sub computer, and wherein the main computer is constructed to apply the reset release signal to the sub computer to thereby forcibly release the sub computer from the reset condition before starting the rewriting operation.

2. The electronic control apparatus of claim 1, wherein:
the reset release signal generating means is a software program stored in a memory rewriting processing program which is common to all of the plurality of computers.

3. The electronic control apparatus of claim 1, further comprising:

a power circuit for monitoring the main computer and applying a reset signal to the main computer to reset the main computer upon detection of an abnormality in the main computer, wherein the main computer is constructed to change an impedance of the terminals to a different impedance for an application of the reset release signal;

wherein the main computer is constructed to be released from the reset condition by the power circuit so that both the main computer and the sub computer are released from the reset condition for performing the rewriting operation, respectively.

4. A data rewriting method for an electronic control apparatus having a first computer and a second computer which has respective non-volatile memories, the method comprising:

executing control programs stored in the non-volatile memories to control actuators connected to ports which are held at a high impedance;

monitoring a first software processing of the first computer by a monitor and resetting the first computer upon detection of an abnormality in the first software processing, the first computer being releasable from a reset condition by the monitor;

monitoring a second software processing of the second computer by the first computer and resetting the second computer upon detection of an abnormality in the second software processing;

rewriting storage data of the non-volatile memories with new data transmitted from an external side under a rewriting voltage is supplied and the computers are released from a reset condition; and releasing forcibly the second computer from the reset condition by a reset release signal generated by the first computer when the first computer determines that it is time to rewrite the storage data of the non-volatile memories, wherein the first computer generates the reset release signal before starting the rewriting of the storage data.

5. The data rewriting method of claim 4, wherein:
the rewriting of the storage data is executed in the first computer and the second computer based on a common program; and the first computer and the second computer are applied with identification signals so that one of the computers which receives an identification signal indicative of the first computer resets the other of the computers.

6. A data rewriting method for an electronic control apparatus having a first computer and a second computer which have respective non-volatile memories, the method comprising:

executing control programs stored in the non-volatile memories to control actuators connected to ports which are held at a high impedance;

monitoring a first software processing of the first computer and resetting the first computer upon detection of an abnormality in the first software processing;

monitoring a second software processing of the second computer by the first computer and resetting the second computer upon detection of an abnormality in the second software processing;

generating a rewriting voltage;

releasing forcibly the second computer from a reset condition by the first computer when the rewriting voltage is generated; and rewriting storage data of the non-volatile memories with new data transmitted from an external side after the second computer is released from the reset condition.

7. The data rewriting method of claim 6, further comprising:

delaying a releasing of the reset condition of the second computer for a predetermined time from a generation of the rewriting voltage.

8. The data rewriting method of claim 6, further comprising:

generating an operation voltage with which an oscillation circuit operates for the first computer and the second computer, wherein releasing of the second computer from the reset condition is effected in response to the rewriting voltage and the operation voltage.

9. The data rewriting method of claim 8, further comprising:

delaying a releasing of the reset condition of the second computer from a generation of the operation voltage.

10. A data rewriting method for an electronic control apparatus mounted on a vehicle, the apparatus having a first computer and a second computer which have non-volatile memories storing a first control program and data and a second control program and data respectively, the first computer being programmed to monitor the second computer and reset the second computer upon detection of an abnormality in the second computer, the method comprising:

generating a rewriting instruction signal from a writing device which stores a new first program and data and a new second control program and data;

releasing forcibly the second computer from a reset condition by the first computer by a reset release signal generated when the rewriting instruction signal is generated;

transmitting at least one of the new first program and data and the new second program and data from the writing device to the first computer and the second computer, respectively; and rewriting the first control program and data and the second control program and data of the non-volatile memories with the new first control program and data and the new second control program data, respectively, only after the second computer is released from the reset condition by the reset release signal.

11. The data rewriting method of claim 10, further comprising:
delaying a releasing of the reset condition of the second computer for a predetermined time from a generation of the rewriting instruction signal.

12. The data rewriting method of claim 11, wherein:
the releasing of the reset condition of the second computer is delayed for a time period in which an oscillation operation of an oscillation circuit for the first computer and the second computer is stabilized.

13. A data rewriting method for an electronic control apparatus having a first computer and a second computer which have respective non-volatile memories, the method comprising:
executing control programs stored in the non-volatile memories to control actuators connected to ports which are held at a high impedance;
monitoring a first software processing of the first computer and resetting the first computer upon detection of an abnormality in the first software processing;
monitoring a second software processing of the second computer by the first computer and resetting the second computer upon detection of an abnormality in the second software processing;
generating a rewriting voltage;
changing an impedance of the port provided for resetting the second computer from the high impedance to a different impedance in response to the rewriting voltage;
generating an operation voltage with which an oscillation circuit operates for the first computer and the second computer;
generating a reset release signal based on the rewriting voltage and the operation voltage, the reset release signal being delayed for a predetermined time from the operation voltage;
releasing forcibly the second computer from a reset condition by the first computer when the reset release signal is generated; and
rewriting storage data of the non-volatile memories with new data transmitted from an external side after the second computer is released from the reset condition by the reset release signal.

14. An electronic control apparatus comprising:
a plurality of computers having respective non-volatile memories which are capable of rewriting storage information in response to data transmitted from an external side, each microcomputer being put in a memory rewriting mode when a rewriting voltage is applied and is released from a reset condition, and terminals of each computer being set to a high impedance condition during a rewriting operation;
identification signal generating means for generating an identification signal indicative of a main computer among the plurality of computers; and
reset release signal generating means for generating a reset release signal from one of the plurality of computers to other computers at the time of putting the plurality of computers in the memory rewriting mode, the one of the plurality of computers being determined as the main computer in response to the identification signal;
wherein the reset release signal generating means is a software program stored in a memory rewriting processing program which is common to all of the plurality of computers.

15. A data rewriting method for an electronic control apparatus having a first computer and a second computer which have respective non-volatile memories, the method comprising:
executing control programs stored in the non-volatile memories to control actuators connected to ports which are held at a high impedance;
monitoring a first software processing of the first computer by monitoring means and resetting the first computer upon detection of an abnormality in the first software processing;
monitoring a second software processing of the second computer by the first computer and resetting the second computer upon detection of an abnormality in the second software processing;
generating a rewriting voltage;
releasing the second computer from a reset condition by the first computer when the rewriting voltage is generated;
rewriting storage data of the non-volatile memories with new data transmitted from an external side when the second computer is released from the reset condition; and
generating an operation voltage with which an oscillation circuit operates for the first computer and the second computer,
wherein releasing of the second computer from the reset condition is effected in response to the rewriting voltage and the operation voltage.

16. The data rewriting method of claim 15, further comprising:
delaying a releasing of the reset condition of the second computer from a generation of the operation voltage.

17. A data rewriting method for an electronic control apparatus mounted on a vehicle, the apparatus having a first computer and a second computer which have non-volatile memories storing a first control program and data and a second control program and data respectively, the method comprising:
generating a rewriting instruction signal from a writing device which stores a new first program and data and a new second control program and data;
releasing the second computer from a reset condition by the first computer when the rewriting instruction signal is generated;
transmitting at least one of the new first program and data and the new second program and data from the writing device to the first computer and the second computer, respectively;
rewriting the first control program and data and the second control program and data of the non-volatile memories with the new first control program and data and the new second control program data, respectively, when the second computer is released from the reset condition; and
delaying a releasing of the reset condition of the second computer from a generation of the rewriting instruction signal;
wherein the releasing of the reset condition of the second computer is delayed for a time period in which an oscillation operation of an oscillation circuit for the first computer and the second computer is stabilized.

* * * * *